(12) United States Patent
Raymond et al.

(10) Patent No.: US 6,578,521 B2
(45) Date of Patent: *Jun. 17, 2003

(54) ANIMAL LITTER COMPOSITION CONTAINING SILICA GEL AND METHODS THEREOF

(75) Inventors: Marvin L. Raymond, Wildwood, MO (US); Anne D. Woodbury, St. Louis, MO (US)

(73) Assignee: Nestec Ltd., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/264,558

(22) Filed: Oct. 4, 2002

(65) Prior Publication Data

US 2003/0051673 A1 Mar. 20, 2003

Related U.S. Application Data

(63) Continuation of application No. 09/731,489, filed on Dec. 7, 2000.

(51) Int. Cl.[7] .................................................. A01K 29/00
(52) U.S. Cl. ........................................................ 119/171
(58) Field of Search ................................ 119/171, 172, 119/173, 165

(56) References Cited

U.S. PATENT DOCUMENTS

| | | |
|---|---|---|
| 4,020,156 A | 4/1977 | Murray et al. |
| 4,085,704 A | 4/1978 | Frazier |
| 4,407,231 A | 10/1983 | Colborn et al. |
| 4,437,429 A | 3/1984 | Goldstein et al. |
| 4,517,308 A | 5/1985 | Ehlenz et al. |
| 4,534,775 A | 8/1985 | Frazier |
| 4,561,997 A | 12/1985 | Roehl |
| 4,604,110 A | 8/1986 | Frazier |
| 4,607,594 A | 8/1986 | Thacker |
| 4,712,508 A | 12/1987 | Lowe |
| 4,795,482 A | 1/1989 | Gioffre et al. |
| 4,898,727 A | 2/1990 | Osada et al. |
| 4,930,443 A | 6/1990 | Lowe, Jr. et al. |
| 5,005,520 A | 4/1991 | Michael |
| 5,035,886 A | 7/1991 | Chakrabarti et al. |
| 5,044,325 A | 9/1991 | Miksitz |
| 5,240,699 A | 8/1993 | Osada et al. |
| 5,336,665 A | 8/1994 | Garner-Gray et al. |
| 5,507,250 A | 4/1996 | Reddy et al. |
| 5,634,431 A | 6/1997 | Reddy et al. |
| 5,662,067 A | 9/1997 | Stubbs et al. |
| 5,970,915 A | 10/1999 | Schlueter et al. |
| 6,106,738 A | 8/2000 | Woo et al. |

Primary Examiner—Charles T. Jordan
Assistant Examiner—Elizabeth Shaw
(74) Attorney, Agent, or Firm—Harness, Dickey & Pierce

(57) ABSTRACT

An animal litter composition comprising a mixture of an absorbant material such as clay and silica gel is disclosed. The Litter composition effectively absorbs liquid wastes and controls odors. Also disclosed are methods of making and using the litter composition.

104 Claims, No Drawings

ANIMAL LITTER COMPOSITION CONTAINING SILICA GEL AND METHODS THEREOF

This application is a continuation of U.S. patent application Ser. No. 09/731,489, filed Dec. 7, 2000, the entire text of which is incorporated herein by reference.

BACKGROUND OF THE INVENTION (1) Field of the Invention

This invention relates generally to animal litter compositions and methods therefor and, more particularly, to novel animal litter compositions containing silica gel and an absorbant material and methods therefor. The new compositions can be characterized as being sorptive for moisture and undesirable odors.

(2) Description of the Related Art

Although a number of absorbant substances can function as animal litter, including recycled newspaper, paper sludge, corn cob granules, rice hulls, peanut hulls, sunflower hulls, alfalfa, cedar, sawdust, and litters made from other organic plant materials, clay is the most commonly used material for litter-box fillers. Typical clays used are calcium and sodium montmorillonites (including sodium bentonite), attapulgites, kaolins, and opal clay mixtures. All of these absorb animal urine and help to cover the fecal waste and decrease odors.

Two types of clays have been used as animal litter. The gelling clays, such as sodium bentonite, form a clump when contacted with animal urine and can, therefore, be scooped out to prevent odor build up. These have been referred to as clumping litters which have grown in popularity to account for over half of all litter sales. Litters made from non-gelling clays, sometimes referred to as non-clumping litters, absorb the urine, but only the solid fecal matter can be scooped out. The non-clumping litters do not last long and are completely changed with fresh material when the odor becomes too strong. This is also true for litters made from materials other than clay.

One disadvantage of clays, and most other materials used for animal litter, is that the odor is not effectively controlled by the litter material. Odors produced from animal urine and fecal materials include ammonia as well as a variety of organic sulfur materials. These typical odorous gases associated with animal waste are not absorbed into clay litter materials, but are adsorbed onto the surface. As a result, the odorous gases volatilize back into the air creating an objectionable odor problem.

Various approaches have been tried to diminish the odor emanating from litter. In one such approach, fragrances have been used to mask odors. U.S. Pat. No. 4,020,156 to Murray et al. discloses fragrance-releasing crystal beads as agents for controlling malodors in pet litter. U.S. Pat. No. 4,085,704 to Frazier discloses a vehicle impregnated with an odor control agent such as a perfume, flavor, fragrance or essence oil, for mixing with an absorbant litter material. The '704 patent disclosed the use of silica gel as one possible carrier for the odor controlling agent, however, this reference neither disclosed nor suggested the use of the silica gel or any other carrier substance in absence of the odor controlling agent nor did this reference suggest the use of the carrier substances for anything more than a vehicle of the odor controlling agent. In that regard, although many substances, including clay litters, can contribute at least some odor controlling activity by absorbing the odorous substances, it is likely that the prior impregnation of the carrier with the odor controlling agent would have precluded the carrier from having any meaningful activity in absorbing the odorous substances from animal urine and feces. Thus, while the use of odor masking agents can be beneficial, their effectiveness is limited by virtue of their acting to mask the odors rather than to eliminate the odors.

Others have used germicides to inhibit odor causing microorganisms. For example, U.S. Pat. No. 4,607,594 disclosed the use of a quaternary amine germicide in a litter composition. U.S. Pat. No. 4,930,443 to Lowe et al. discloses an animal litter which includes a bacterial and fungal growth inhibitor, polyvinylpyrrolidone iodine complex, which is dissolved in water and sprayed onto the litter. Furthermore, various chemicals have also been used to react with the odor-causing substances. U.S. Pat. No. 4,607,594 to Thacker discloses an animal litter using buffering agents such as a carbonate, a bicarbonate or hydrogen phosphate. U.S. Pat. No. 5,005,520 to Michael discloses the use of an oxidizing additive, such as sodium perborate in animal litter. Similarly Reddy et al. disclosed the addition of urease negative bacteria to clay pet litter to inhibit the growth of urease positive bacteria, thereby retarding formation of ammonia and other obnoxious odors (U.S. Pat. Nos. 5,507, 250 and 5,634,4310). None of these approaches, however, have been effective in preventing the development of odorous substances from animal litter containing animal waste products.

In another approach, animal litter can be made of substances which exert a sorptive effect on odorous gases. For example, U.S. Pat. No. 6,106,738 to Woo et al. discloses spraying a cyclodextrin solution onto cat litter to absorb malodor. Similarly, zeolites have been used in cat litters to adsorb odorous gases. Cat litters which are 100% zeolite are currently marketed in the U.S. Alternatively, zeolites can be added to clay litters to control odor. For example, U.S. Pat. No. 4,437,429 to Goldstein et al. discloses the addition of zeolites to the clay component of animal litter to control odors from the litter. Zeolites are, however, significantly more expensive than clay and, as a result, litters made from zeolite tend to be more expensive than clay litters.

A number of substances have been used to eliminate odors due to organic molecular species in air filtering systems. Among these substances, silica gel has been used as a solid adsorbent for removing odors from the air. (see for example, U.S. Pat. Nos. 4,795,482, 4,604,110, 4,534,775 and 4,517, 308). In that regard, silica gel has been mentioned as one possible odor absorbing material for use in an air filter component of a litter box assembly to remove undesirable odors. Thus, U.S. Pat. No. 5,044,325 to Miksitz discloses an animal litter box which includes a litter box tray and housing and an exhaust fan coupled with an odor absorbing filter assembly to deodorize the air before venting the air from the litter box.

Recently, silica gel has been employed as a litter box filler (see U.S. Pat. No. 5,970,915). The silica gel used was macroporous silica gel which was reported to effectively eliminate odors in addition to absorbing moisture from the urine. A significant problem with the use of silica gel as an animal litter is that silica gel is substantially more costly than clay litter box fillers. Although 100% silica gel has been used as a litter to absorb odors, silica gel has not been used as a component of a litter composition in combination with clay litter because it has not heretofore been appreciated that silica gel could serve as an effective odor control agent when mixed with a clay litter. Thus there remains a continuing need for new animal litter compositions which control odors in addition to absorbing liquid animal waste materials.

SUMMARY OF THE INVENTION

Accordingly, the inventors herein have succeeded in discovering that silica gel can be combined with an absorbant material, preferably clay, in an animal litter composition. Surprisingly, the animal litter composition containing the silica gel is effective in controlling odor.

Thus, in one embodiment the present invention is directed to an animal litter composition comprising a mixture of an absorbant material and silica gel. The silica gel is present in the composition in an amount effective in controlling odor in the composition. By controlling odor, it is meant that the amount of detectable, odorous substances emanating from the litter upon use of the litter by the animal, are diminished. Preferably, the silica gel is a Type C silica gel. The silica gel is present in the composition in an amount, preferably, from about 5% to about 50% (w/w). By "w/w" in the context of a percent of a composition, it is meant that the amount of a component of a composition is calculated as the ratio of the weight of that component divided by the total weight of the composition multiplied by 100 to obtain the percent value. The term "about" as used herein is intended to indicate a range of values of 10% greater and lesser than the indicated value. Thus, about 5% is intended to encompass a range of values from 4.5% to 5.5%.

Preferably, the silica gel is in the form of particles. The silica gel particles have an average pore diameter, preferably, from about 8 nm. to about 10 nm.

The absorbant material of the animal litter composition is, preferably, clay. The clay of the present invention is, preferably, selected from the group consisting of a smectite, an attapulgite, a kaolin, an opal clay and mixtures thereof. The smectite is preferably a calcium montmorillonite or a sodium bentonite. The amount of clay in the animal litter composition is, preferably, from about 50% to about 95% (w/w). Both the silica gel and clay components of the animal litter composition are in the form of particles of similar average size and shape so that no separation occurs upon preparation and handling, i.e. the more dense clay particles do not tend to settle to the bottom of the composition and/or the less dense silica gel particles do not tend to rise to the top of the composition. Thus, the clay particles, preferably, have an average size and shape sufficiently similar to the average size and shape of the silica gel particles to prevent separation of the clay particles and silica gel particles. Preferably, the average size of the clay particles is no more than 10% greater or lesser than the average particle size of the silica gel particles. Preferably, at least 90% (w/w) of the clay comprises clay particles having a diameter of from about 0.6 mm to about 3.4 mm and at least 90% (w/w) of the silica gel particles comprises silica gel particles having a diameter of from about 1 mm to about 5 mm.

In certain aspects of this embodiment, the composition can further comprise an odor masking agent which is preferably, a perfume, a fragrance, or an essential oil. The odor masking agent may be incorporated into a carrier which may be silica gel; however, when the odor masking agent is present and silica gel is used as a carrier, at least some of the silica gel component of the composition has no adsorbed odor-masking agent and exerts an odor-masking function.

In another embodiment, the present invention is directed to a granular composition. The composition comprises clay and silica gel. The silica gel is not impregnated with an odor-masking agent. As a result, the silica gel can serve an odor-controlling function in the composition. The silica gel is, preferably, Type C silica gel and the composition comprises, preferably, from about 5% to about 50% (w/w) silica gel. The silica gel is, preferably, in the form of particles having an average pore diameter from about 8 nm. to about 10 nm.

Preferably, the absorbant material is clay which may be, but is not limited to, a smectite, an attapulgite, a kaolin, an opal clay or a mixture thereof. The smectite is preferably a calcium montmorillonite or a sodium bentonite. The composition, preferably, comprises from about 50% to about 95% (w/w) clay. Both the clay and silica gel are in the form of particles. The clay particles are, preferably, have an average size and shape sufficiently similar to average size and shape of the silica gel particles to prevent separation of the clay particles and silica gel particles. Preferably, the average size of the clay particles is no more than 10% greater or lesser than the average particle size of the silica gel particles. Preferably, at least 90% (w/w) of the clay comprises clay particles having a diameter of from about 0.6 mm to about 3.4 mm, and at least 90% (w/w) of the silica gel particles comprises silica gel particles having a diameter of from about 1 mm to about 5 mm.

In certain aspects of this embodiment, the composition can further comprise an odor masking agent which is preferably, a perfume, a fragrance, or an essential oil. The odor-masking agent may be incorporated into a carrier which may be silica gel, however, when the odor masking agent is present and silica gel is used as a carrier, at least some of the silica gel component of the composition has no adsorbed odor-masking agent and exerts an odor-controlling function.

Another embodiment of the present invention is directed to an animal litter composition which comprises an absorbant material and silica gel. The silica gel is present in an amount selected to control odor in the composition. Reference to the silica gel being selected to control odor is intended to mean that the silica gel is incorporated into the composition on the basis of its exerting an odor-controlling effect. Such selecting may be, in whole or in part, comprised of determining that the silica gel in the composition exerts an odor-controlling effect.

The silica gel is, preferably, Type C silica gel and the composition comprises, preferably, from about 5% to about 50% (w/w) silica gel. The silica gel is, preferably, in the form of particles having an average pore diameter from about 8 nm. to about 10 nm.

The absorbant material is, preferably, clay which may be, but is not limited to, a smectite, an attapulgite, a kaolin, an opal clay or a mixture thereof. The smectite is preferably a calcium montmorillonite or a sodium bentonite. The composition, preferably, comprises from about 50% to about 95% (w/w) clay. Both the clay and silica gel are in the form of particles. The clay particles, preferably, have an average size and shape sufficiently similar to average size and shape of the silica gel particles to prevent separation of the clay particles and silica gel particles. Preferably, the average size of the clay particles is no more than 10% greater or lesser than the average particle size of the silica gel particles. Preferably, at least 90% (w/w) of the clay comprises clay particles having a diameter of from about 0.6 mm to about 3.4 mm and at least 90% (w/w) of the silica gel particles comprises silica gel particles having a diameter of from about 1 mm to about 5 mm.

In certain aspects of this embodiment, the composition can further comprise an odor masking agent which is preferably, a perfume, a fragrance, or an essential oil. The odor-masking agent may be incorporated into a carrier which may be silica gel, however, when the odor masking agent is present and silica gel is used as a carrier, at least some of the silica gel component of the composition has no adsorbed odor-masking agent and exerts an odor-controlling function. Alternatively, all of the silica gel present in the composition can be partially impregnated with an odor masking agent, however, the silica gel, nevertheless, exerts an odor-controlling function in addition to being a carrier for the odor-masking agent. Furthermore, in all aspects of this embodiment, the silica gel is selected, in whole or in part, on the basis of the silica gel exerting an odor-controlling effect whether or not the silica gel also serves an additional function of acting as a carrier for an odor-masking agent.

Another embodiment of the present invention is directed to a kit. The kit comprises silica gel and instructions for addition of the silica gel to an animal litter composition in an amount effective in controlling odor in the composition. The components of the kit are packaged in a container. The instructions can be in the form of an instruction manual, an enclosed pamphlet or product insert, printed instructions on the packaging container or any form of written instructions accompanying the silica gel component of the kit. Preferably, the silica gel is Type C silica gel comprising particles having an average pore diameter from about 8 nm to about 10 nm. The instructions indicate that the silica gel is to be added to an animal litter composition. The amount of silica gel to he added to the animal litter composition can be indicated to be a value of from about 5% to about 50% (w/w) silica gel. Preferably, the instructions call for the addition of the silica gel to a clay animal litter composition. In an alternative embodiment, the kit can comprise silica gel, an adsorbant material and instructions for mixing the silica gel with the adsorbant material. Preferably, the clay is selected from the group consisting of a smectite, an attapulgite, a kaolin, an opal clay and a mixture thereof. The smectite is preferably a calcium montmorillonite or a sodium bentonite. Preferably, the instructions indicate that the silica gel is to be added to from about 50% to about 95% (w/w) clay. In certain aspects of this embodiment, the clay and silica gel are both in the form of particles of similar average size and shape. Preferably, the average size of the clay particles is no more than 10% greater or lesser than the average particle size of the silica gel particles. It is also preferred that at least 90% (w/w) of the clay comprises clay particles have a diameter of from about 3.4 mm to about 0.6 mm, and at least 90% (w/w) of the silica gel particles comprises silica gel particles having a diameter of from about 5 mm to about 1 mm.

The kit can further comprising an odor masking agent which can be a perfume, a fragrance, or an essential oil.

In another embodiment, the present invention is directed to a method for controlling odor in an animal litter. The method comprises adding silica gel to an animal litter comprising an absorbant material. The silica gel is added in an amount effective in controlling odor. Preferably, the silica gel is Type C silica gel and the composition comprises, preferably, from about 5% to about 50% (w/w) silica gel. The silica gel is, preferably, in the form of particles having an average pore diameter from about 8 nm. to about 10 nm.

The absorbant material is, preferably, clay which may be, but is not limited to, a smectite, an attapulgite, a kaolin, an opal clay or a mixture thereof. The smectite is preferably a calcium montmorillonite or a sodium bentonite. The composition, preferably, comprises from about 50% to about 95% (w/w) clay. Both the clay and silica gel are in the form of particles. The clay particles, preferably, have an average size and shape sufficiently similar to average size and shape of the silica gel particles to prevent separation of the clay particles and silica gel particles. Preferably, the average size of the clay particles is no more than 10% greater or lesser than the average particle size of the silica gel particles.

Preferably, at least 90% (w/w) of the clay comprises clay particles having a diameter of from about 0.6 mm to about 3.4 mm and at least 90% (w/w) of the silica gel particles comprises silica gel particles having a diameter of from about 1 mm to about 5 mm.

In certain aspects of this embodiment, the method further comprises adding an odor-masking agent which is preferably, a perfume, a fragrance, or an essential oil. The odor-masking agent may be incorporated into a carrier which may be silica gel, however, when the odor masking agent is present and silica gel is used as a carrier, at least some of the silica gel component of the composition has no adsorbed odor-masking agent and exerts an odor-controlling function.

Another embodiment of the present invention is directed to a method for controlling odor in an animal litter. The method comprises selecting silica gel on the basis of the silica gel providing odor control and adding the silica gel to an animal litter containing an absorbant material. Selecting the silica gel on the basis of its exerting an odor-controlling effect may be, in whole or in part, comprised of determining that the silica gel in the composition exerts an odor-controlling effect.

The silica gel is, preferably, Type C silica gel and the composition comprises, preferably, from about 5% to about 50% (w/w) silica gel. The silica gel is, preferably, in the form of particles having an average pore diameter from about 8 nm. to about 10 nm.

The absorbant material is, preferably, clay which may be, but is not limited to, a smectite, an attapulgite, a kaolin, an opal clay or a mixture thereof. The smectite is preferably a calcium montmorillonite or a sodium bentonite. The animal litter composition, preferably, comprises from about 50% to about 95% (w/w) clay. Both the clay and silica gel are in the form of particles. The clay particles, preferably, have an average size and shape sufficiently similar to average size and shape of the silica gel particles to prevent separation of the clay particles and silica gel particles. Preferably, the average size of the clay particles is no more than 10% greater or lesser than the average particle size of the silica gel particles. Preferably, at least 90% (w/w) of the clay comprises clay particles having a diameter of from about 0.6 mm to about 3.4 mm, and at least 90% (w/w) of the silica gel particles comprises silica gel particles having a diameter of from about 1 mm to about 5 mm.

In certain aspects of this embodiment, the method can further comprise adding an odor-masking agent which is preferably, a perfume, a fragrance, or an essential oil. The odor masking agent may be incorporated into a carrier which may be silica gel, however, when the odor masking agent is present and silica gel is used as a carrier, at least some of the silica gel component of the composition has no adsorbed odor-masking agent and exerts an odor-controlling function. Alternatively, all of the silica gel present in the composition can be partially impregnated with an odor masking agent, however, the silica gel, nevertheless, exerts an odor-controlling function in addition to being a carrier for the odor-masking agent. Furthermore, in all aspects of this embodiment, the silica gel is selected, in whole or in part, on the basis of the silica gel exerting an odor-controlling effect whether or not the silica gel also serves an additional function of acting as a carrier for an odor-masking agent Another embodiment of the present invention is directed to a method for making an odor-controlling animal litter composition. The method comprises combining an absorbant material and an amount of silica gel amount effective in controlling odor. Preferably, the silica gel is Type C silica gel and the composition comprises, preferably, from about 5% to about 50% (w/w) silica gel. The silica gel is, preferably, in the form of particles having an average pore diameter from about 8 nm. to about 10 nm.

The absorbant material is, preferably, clay which may be, but is not limited to, a smectite, an attapulgite, a kaolin, an opal clay or a mixture thereof. The composition, preferably, comprises from about 50% to about 95% (w/w) clay. Both the clay and silica gel are in the form of particles. The clay particles are, preferably, have an average size and shape sufficiently similar to average size and shape of the silica gel particles to prevent separation of the clay particles and silica gel particles. Preferably, the average size of the clay particles is no more than 10% greater or lesser than the average particle size of the silica gel particles. Preferably, at least 90% (w/w) of the clay comprises clay particles having a diameter of from about 0.6 mm to about 3.4 mm and at least 90% (w/w) of the silica gel particles comprises silica gel particles having a diameter of from about 1 mm to about 5 mm.

In certain aspects of this embodiment, the method can further comprise adding an odor masking agent which is preferably, a perfume, a fragrance, or an essential oil. The odor-masking agent may be incorporated into a carrier which may be silica gel, however, when the odor-masking agent is present and silica gel is used as a carrier, at least some of the silica gel component of the composition has no adsorbed odor-masking agent and exerts an odor-controlling function.

In another embodiment, the present invention is directed to a method for making an odor-controlling animal litter composition. The method comprises selecting silica gel on the basis of the silica gel providing odor control and adding the silica gel to an animal litter containing an absorbant material. Selecting the silica gel on the basis of its exerting an odor-controlling effect may be, in whole or in part, comprised of determining that the silica gel in the composition exerts an odor-controlling effect.

The silica gel is, preferably, Type C silica gel and the composition comprises, preferably, from about 5% to about 50% (w/w) silica gel. The silica gel is, preferably, in the form of particles having an average pore diameter from about 8 nm. to about 10 nm.

The absorbant material is, preferably, clay which may be, but is not limited to, a smectite, an attapulgite, a kaolin, an opal clay or a mixture thereof. The smectite is preferably a calcium montmorillonite or a sodium bentonite. The animal litter composition, preferably, comprises from about 50% to about 95% (w/w) clay. Both the clay and silica gel are in the form of particles. The clay particles, preferably, have an average size and shape sufficiently similar to average size and shape of the silica gel particles to prevent separation of the clay particles and silica gel particles. Preferably, the average size of the clay particles is no more than 10% greater or lesser than the average particle size of the silica gel particles. Preferably, at least 90% (w/w) of the clay comprises clay particles having a diameter of from about 0.6 mm to about 3.4 mm, and at least 90% (w/w) of the silica gel particles comprises silica gel particles having a diameter of from about 1 mm to about 5 mm.

In certain aspects of this embodiment, the method can further comprise adding an odor masking agent which is preferably, a perfume, a fragrance, or an essential oil. The odor-masking agent may be incorporated into a carrier which may be silica gel, however, when the odor-masking agent is present and silica gel is used as a carrier, at least some of the silica gel component of the composition has no adsorbed odor-masking agent and exerts an odor-controlling function. Alternatively, all of the silica gel present in the composition can be partially impregnated with an odor masking agent, however, the silica gel, nevertheless, exerts an odor-controlling function in addition to being a carrier for the odor-masking agent. Furthermore, in all aspects of this embodiment, the silica gel is selected, in whole or in part, on the basis of the silica gel exerting an odor-controlling effect whether or not the silica gel also serves an additional function of acting as a carrier for an odor-masking agent.

Among the several advantages achieved by the present invention, therefore, may be noted the provision of an animal litter composition and a granular composition that have an odor-controlling silica gel component; the provision of a clay-based animal litter composition which can be used for a longer period of time by virtue of its containing an odor-controlling silica gel component; the provision of an animal litter composition which exerts an odor-controlling effect at a lower cost than a litter of 100% silica gel; the provision of an odor-controlling advantages of silica gel and the water absorbing and wicking effect of clay in an animal litter composition; the provision of kits for preparing an odor-controlling litter composition; and the provision of methods of making and methods of using such animal litter compositions.

DESCRIPTION OF THE PREFERRED EMBODIMENTS

The present invention is based upon the discovery that silica gel can be incorporated into an animal litter composition containing an absorbant material such as clay, to effectively control odor as the litter composition is used. The silica gel component can be any of a variety of silica gels suitable for adsorbing organic materials typically found in animal litter upon use by the animal. Such organic materials include organic sulfur materials.

Silica gels can be classified according to pore size as Type A, Type B, Type C or wide pore silica gel. The average pore sizes range from about 18 to about 120 angstrom (1.8 to 12 nm.) according to the silica gel type. Preferably, the silica gel of the present invention is a macroporous silica gel of Type B, Type C or wide pore silica gel. Type A silica gel tends to have a narrow pore size and is less preferred. Most preferably, the silica gel of the present invention is Type C silica gel having an average pore diameter in the range of from about 80 to about 100 angstroms, i.e., about 8 to about 10 nm.

The silica gel is comprised of particles, preferably, in the form of either rounded beads or irregularly shaped granules. Among different batches of silica gels used in the present invention the silica gel particles may have average particle diameters, preferably, from about 0.5 to about 10 mm and more preferably from about 1 to about 5 mm. Within batches of silica gel, it is desirable that at least about 80% of the particles have a diameter from about 1 to about 5 mm, more preferably at least about 90% of the particles have a diameter from about 1 to about 5 mm and most preferably at least about 95% or more of the particles have a diameter from about 1 to about 5 mm.

The amount of silica gel in the compositions is preferably, about 1% (w/w); more preferably, about 2.5% (w/w); more preferably, about 5% (w/w); more preferably, about 10%; more preferably, about 15% (w/w); more preferably, about 20% (w/w); more preferably, about 25% (w/w); more preferably, about 30% (w/w); more preferably, about 40% (w/w); and more preferably about 50% (w/w); more preferably, about 60% (w/w); more preferably about 70% (w/w) or greater.

The silica gel component of the composition of the present invention provides odor control for the composition such that when the composition is used as an animal litter, the amount of odorous substances detectable emanating from the composition is diminished. While not intending to be bound by any particular mechanism of action, it is believed that the odor controlling function of the silica gel results from adsorption of the odorous substances on to pore surfaces of the silica gel. This adsorption may also be associated with a decomposition of the odorous substances. Nevertheless, regardless of the specific mechanism of action, the silica gel of the present invention serves to control odor in the composition as it is used by the animal, i.e., the silica gel decreases the odorous substances escaping from the composition after it is used by the animal.

In certain embodiments, the silica gel component of the composition is selected on the basis of the silica gel providing odor control. Such selecting can involve, in whole or in part, determining that the silica gel component of the composition exerts an odor controlling function. This can also involve testing for the decrease in odor production by the composition or it can involve no more than recognizing that the silica gel component functions to control odors.

Testing for the odor controlling function can be by any method known in the art. For example any of the hedonic testing systems can be used such as application of the nine point hedonic scale. Typically such testing methods use a panel of individuals, preferably trained individuals, who score the organoleptic quality of odor for a particular composition on a standard scale (see, for example, Stone and Sidel in Sensory Evaluation Practices, Academic Press, Orlando, 1985, pp. 58–86, 227–252). The collective values obtained from the panel indicate whether the odor of the composition is objectionable and comparison with control compositions not containing the silica gel can indicate whether the odor is diminished by the silica gel component.

The compositions of the present invention also contain an absorbant material. The absorbant material serves to absorb the liquid components of animal wastes. By way of comparison, animal litter compositions containing silica gel and no other absorptive material, can become saturated with animal urine causing a pooling of liquid waste and odor build up in that area of the litter material. In contrast, the litter material of the present invention which is a mixture of silica gel and absorptive material. This component of clay or other absorptive material serves to effectively wick the moisture away to avoid the formation of liquid pooling.

A number of absorbant materials are known in the art. Among the absrobant materials that can be used clay is most commonly used and clay is the preferred absorbant of the present invention. Nevertheless a variety of other absorbant materials can be used including, but not limited to such adsorbant materials as recycled newspaper paper sludge, corn cob granules, rice hulls, peanut hulls, sunflower hulls, alfalfa, cedar, sawdust, litters made from other organic plant materials and the like.

A number of types of clays can be used as the absorbant material in the compositions of the present invention. Typical clays used are smectites (including calcium montmorillonites and sodium bentonite), attapulgites, kaolins, and opal clay mixtures.

The smectite clays are hydrated aluminum magnesium silicates in the form of either calcium or sodium salts. The term "montmorillonite" is used herein in reference to the calcium smectite clays, i.e. calcium montmorillonite clays, and the term "bentonite" is used herein in reference to the sodium smectite clays, i.e. sodium bentonite clays. Both calcium montmorillonite and sodium bentonite clays are commonly used as pet litter. Calcium montmorillonite is an acid-activatable clay. Such acid activation can increase the surface area and enhance the absorptive properties of calcium montmorillonite. Sodium bentonite, also known as Wyoming or western bentonite, tends to be less absorptive than calcium montmorillonite. Sodium bentonite and, to a lesser extent, calcium montmorillonite, both swell upon absorbing water to form gel-like masses. The agglomerations of sodium bentonite clay and moist animal wastes form isolatable clumps which can be readily removed from the litter composition.

Attapulgite clay, which is hydrous magnesium aluminum silicate, is also commonly used in pet litters. Kaolin, or china clay, and sedimentary opal clay mixtures can also be used in animal litter compositions. Kaolin is a hydrous aluminum silicate of the Kaolinite mineral group. Opal clay contains a grated amount silicon dioxide than bentonite and provides a high porosity and high absorption capacity.

Preferably, the clay component of the compositions of the present invention are, preferably, in an amount of, preferably, about 30% (w/w); more preferably, about 40% (w/w); more preferably, about 50% (w/w); more preferably, about 60% (w/w); more preferably, about 70% (w/w); more preferably, about 75% (w/w); more preferably, about 80% (w/w) (w/w); more preferably, about 85% (w/w); more preferably, about 90% (w/w); more preferably, about 95% (w/w) or greater.

Both the silica gel and the clay components are, preferably, in the form of particles. Typically, granular particles of calcium montmorillonite clay that may be used in the compositions of the present invention have an average diameter of from about 0.2 mm to about 10 mm, more preferably from about 0.5 to about 5 mm and more preferably from about 1 mm to about 2.5 mm and the silica gel particles have a similar size range. Thus, in one aspect of the present invention, both the silica gel and the clay components are in the form of particles of a similar average size so as to avoid settling and separation of the clay particles from the silica gel particles.

Clay particles tend to be more dense than silica gel particles. For example, typical silica gel has a free fall bulk density of 20–30 lbs./cu. ft. whereas typical clays for animal litter have a bulk density of 30–70 lbs./cu.ft. For example, attapulgite clays from Georgia and the southeast have a bulk density of 30–38 lb./cu.ft.; calcium montmorillonite or calcium smectites have a bulk density of 42–52 lb./cu/ft.; and sodium bentonite has a bulk density of 62–70 lb./cu.ft.

As a result of the difference in the densities of silica gel and clay particles, mixtures could tend to separate into its separate components during preparation and handling, i.e. the clay particles could settle to the bottom and the silica gel particles could tend to rise to the top of the mixture.

It is believed that this separation can be diminished by selecting clay particles and silica gel particles of a similar size. Thus, it is preferred that both the silica gel and clay components of the animal litter composition are in the form of particles of similar average size so as to diminish any separation due to the different densities of silica gel and clay. This can be achieved in the present invention by selecting silica gel and clay components such that the average size of the clay particles is, preferably, no more than 20% greater or lesser than the average particle size of the silica gel particles; more preferably, the average size of the clay particles is no more than 15% greater or lesser than the average particle size of the silica gel particles; more preferably, the average size of the clay particles is no more than 10% greater or lesser than the average particle size of the silica gel particles; and more preferably, the average size of the clay particles is no more than 5% greater or lesser than the average particle size of the silica gel particles.

The selection of silica gel and clay particles of similar size may also be achieved by selecting silica gel and clay components which each have a ranges of particle sizes overlapping each other. Preferably, at least 90% (w/w) of the clay comprises clay particles have a diameter within a range that overlaps the range of diameters of particles which comprise of 90% (w/w) of the silica gel. In one preferred embodiment, at least 90% (w/w) of the clay comprises clay particles have a diameter of from about 0.6 mm to about 3.4 mm and at least 90% (w/w) of the silica gel particles comprises silica gel particles having a diameter of from about 1 mm to about 5 mm.

Shape is also believed to be a factor in that granular or irregularly shaped silica gel particles tend to mix more easily with irregularly shaped particles. It has been observed that silica gel made into spherical beads does not mix well or stay mixed with granular clay particles. There are even slight differences observed for granular products in which clay granules that are made flatter from the granulation process are more difficult to mix with the more bulky silica gel particles. For example, processed clay from California such as monterey shale, has more rounded or bulkier granules and seems to mix more easily with similarly shaped silica gel granules than the flatter clay granules such as calcium montmorillonite from Missouri.

In another aspect of the present invention, the composition, in certain embodiments, can further comprise an odor masking agent. By odor masking agent it is meant that the agent acts to diminish perception of the odor without necessarily altering the amount of odor released from the animal litter upon its use. Any of a variety of perfumes, fragrances and essential oils can be used as the odor masking agent including, but not limited to, heliotropine, lemongrass oil, 1,8-cineole, terpineol, listea cubeba oil, citronella oil, cedarwood oil, ginger oil, eucalyptus oil, orange oil, andrane, benzyl acetate, benzyl benzoate, camphor oil, carvone, cedrole, cedrone, cedryl acetate, cedryl methyl ether, cineol, coumarin, diphenylide, ethyl butyrate, jasmin sambac chine concrete, linalool, methyl benzoate, musk ambrette, musk jinghai, musk ketone, musk xylol, phenyl ethyl alcohol, raspberry ketone, roselin, spearmint oil, borneol, sandenol, vanillin, wintergreen oil and combinations thereof. The odor masking agent can also be any of a number of organic substances exhibiting desirable aromatic organoleptic characteristics. Such organic substances include alcohols, aldehydes, esters, ketones, ethers, phenols, lactones, carboxylic acids, nitrites and the like. Typical chemical substances in certain floural fragrances include 1,4-dimethoxy benzene, 2-phenyl nitroethane, 3,5-dimethoxy toluene, 4-keto β-ionone, 4-terpineol, 5-dimethyl 2-ethyl pyrazine, α-caryophyllene, α-elemene, α-farnesene, α-terpineol, anisic aldehyde, anisyl acetate, β-damascenone, β-Ionone, β-pinene, benzaldehyde, benzyl acetate, benzyl alcohol, $C_{15}$ hydrocarbons, caryophyllene, cis 3-hexenyl acetate, cis 3-hexenyl butyrate, cis jasmone, cis/trans ocimene, citronellol, cyclocitral, δ-dodecalactone, dihydro β-ionol, dihydro β-ionone, ethyl jasmonate, eugenol, geraniol, geranyl acetone, heptadecadiene, hexyl acetate, indole, jasmin lactone, lilac alcohols, lilac aldehydes, limonene, linalool, linalool oxides, methyl 5-hepten-2-1, methyl anthranilate, methyl benzoate, methyl salicylate, n-hexanol, n-pentadecane, nerol-geraniol, nerolidol, p-dimethoxy benzene, phenyl ethyl acetate, phenyl ethyl acetate, phenyl ethyl acetate, t-terpinene, trans β-ocimene, pinene, terpineol and combinations thereof.

The odor-masking agent may be encapsulated such as in encapsulated fragrance powders or incorporated into a carrier system, a number of which are known in the art (See, for example, U.S. Pat. Nos. 4,085,704; 4,898,727; 4, 561,997; 5,240,699; 5,035,886; and 5,336,665). In certain embodiments, silica gel can be used as a carrier. However, in those embodiments in which silica gel is used as a carrier for the odor masking agent, the composition contains at least some silica gel which has no adsorbed odor-masking agent so that the silica gel can exert an odor-controlling function. Alternatively, in other embodiments, the silica gel may be only partially impregnated with an odor-masking agent so that the silica gel particles can still act to control odors. This would be the case if at least a portion of the adsorptive sites in the silica gel particles remain free to adsorb odorous substances from the animal waste materials and allow the silica gel to exert an odor-controlling function.

Additional components can also be added to the animal litter composition including dust control agents, antimicrobial agents, coloring agents, guar gum and the like.

The present invention also encompasses kits suitable for preparing an animal litter composition. The kit can comprise an amount of silica gel with instructions for addition of the silica gel to an adsorbant litter material, preferably a clay litter material. The kit can also contain silica gel and clay litter material in separate containers along with instructions for addition of the silica gel to the absorbant litter material. The instructions can be in the form of an instruction manual, a product brochure or insert, written instructions on a packaging container, or any form of medium for communication of such instructions, preferably, in written form.

The present invention is further directed to methods of making and using the compositions of the present invention. Thus, in one embodiment, the present invention is directed to a method for controlling odor in an animal litter. The method comprises adding silica gel to an animal litter comprising an absorbant material, preferably clay. The silica gel is added in an amount effective in controlling odor. In an alternative embodiment, the method can comprise selecting silica gel on the basis of the silica gel providing odor control and adding the silica gel to an animal litter containing an absorbant material. Selecting the silica gel on the basis of its exerting an odor-controlling effect may be, in whole or in part, comprised of determining that the silica gel in the composition exerts an odor-controlling effect.

The present invention is also directed to a method for making an odor-controlling animal litter composition. The method comprises combining an absorbant material and an amount of silica gel amount effective in controlling odor. In an alternative embodiment, the method can comprise selecting silica gel on the basis of the silica gel providing odor control and adding the silica gel to an animal litter containing an absorbant material. Selecting the silica gel on the basis of its exerting an odor-controlling effect may be, in whole or in part, comprised of determining that the silica gel in the composition exerts an odor-controlling effect.

INDUSTRIAL APPLICATION

The present invention provides new compositions and methods based upon the discovery that silica gel can be combined with an adsorbant material, preferably a clay, to produce an animal litter composition. The silica gel functions in an odor-controlling manner and the clay serves to absorb liquids and to act to wick the liquids away from the silica gel. Thus the composition not only absorbs liquid waste materials deposited by the animal, but it also effectively controls odors. In certain embodiments, a clumping clay is used so that the animal waste materials are agglomerated to facilitate their removal. The invention is directed to compositions suitable for use as animal litters as well as to methods of making and using the animal litter compositions.

Preferred embodiments of the invention are described in the following examples. Other embodiments within the scope of the claims herein will be apparent to one skilled in the art from consideration of the specification and the examples that follow or from practice of the invention as disclosed herein.

GENERAL TESTING PROCEDURES

The general testing procedures used in the examples below are as follows.

Testing Environment

The sensory lab is maintained at 75° F. and with positive pressure ventilation to maintain an odor-free environment. The lab contains booths for sensory testing of odors. Exhaust fans in each booth remove any odors that may escape from samples being evaluated.

All materials in the lab including counters, partitions, walls, etc. are odor-free.

The testing area is maintained quiet and free from distractions. Insulated ceiling tiles are used to reduce noise from surrounding areas.

The booths allow the panelists to evaluate samples without distractions among panelists. Panelists move from booth to booth to evaluate samples. No chairs are used and a waiting room is used as a buffer between the booths and hallway.

Panelists

Twelve to eighteen screened and trained panelists are used for each test. Panelists are screened for odor discrimination abilith and odor recognition. Panelists are trained for attribute rating as suggested in *Guidelines for the Selection and Training of Sensory Panel Members*, ASTM publication 758.

Samples
One Time Hand Treatment: If samples are to be hand treated, one rectangular box (1.5" wide×12" long×3.5" deep) per treatment variable is prepared and treated. The litter sample is stirred thoroughly to ensure a homogenous mixture in each box. A volume equivalent to 4.5 pounds scoop litter is placed in each box. Eight 20-gram fecal cubes are place on top of the litter. One hundred and sixty milliliters female urine is poured over the fecal cubes wetting as much of the litter as possible. A volume equivalent to 0.5 pounds scoop litter is used to cover the fecal cubes and wet litter. Boxes are left uncovered for 5 days. No further waste material are added to the box. On the sixth day, litter is cleaned of fecal material and urine clumps (if possible).
One day prior to sensory evaluation the following is done.
  a. Litter is stirred thoroughly to ensure a homogenous mixture in each box.
  b. If used, duplicate boxes are combined into one sample.
  c. Litter is passed through the splitter, recombined, passed through the splitter a second time and recombined.
  d. The recombined samples are split into three or four equal volume samples by using the splitter.
  e. Each split sample is put into urine specimen cups. Other sample containers could be used if dictated by the test purpose.
  f. Each specimen cup is covered with a lid.
  g. Sample containers are identified with 3-digit random codes.
  h. Samples are placed in the testing booths the day before testing in numerical order.

Test Procedure

A balanced block test design is used when possible. Replicates are used for each variable when possible. Panelists rate aroma intensities of each sample. Generally fecal/urine, ammonia and/or fragrance aromas are rated. A 6-inch line scale with indented anchors labeled "weak" and "strong" is used.

Panelists are instructed to use the following sniffing procedures:
  (1) 2–3 quick sniffs
  (2) Mouth closed during sniffing
  (3) Lid replaced immediately after sniffing
  (4) Nose cleared by smelling ground coffee, if necessary Panelists evaluate the samples in the order they are listed on their scorecards. Panelists are instructed to take a 5 minute break between tests or after every 10–12 samples. Descriptive analysis is most often used with the trained panelists. However, as the test purpose dictates, differences or ranking tests could also be used. The ranking tests can be reported as individual ranking scores or as a ranking sum. In all methods, standard sensory procedures are used to ensure reliable and valid data.

Data Analysis

Analysis of variance, ranks, mean score differences and Duncan's multiple comparison test can be used to analyze data. (for review of testing and analysis system, see ASTM Manual Series: MNL 26 revison of STP434, 1996)

EXAMPLE 1

This example illustrates the odor-controlling effect of silica gel at 1%, 5%, 10% and 20% in a mixture with a calcium montmorillonite clay litter obtained from Bloomfield, Mo.

Two different grades of silica gel were evaluated: 6–12 mesh desiccant grade silica gel obtained from Fisher Scientific Co. (St. Louis, Mo.) and LITTER PEARLS (Harvest Ventures, Inc., St. Bonifacius, Minn.). The clay component for litter compositions was a commercially available Bloomfield clay litter. The litter compositions were prepared in 5 pound samples which were mixed by tumbling. Silica gel components, in the amounts of 22.7, 113.4, 226.8 and 453.6 grams were combined with 4.95, 4.75, 4.5 and 4.0 pounds, respectively, of the Bloomfield clay litter to produce 1%, 5%, 10% and 20% samples.

Fifty gram portions of each of the preparations were placed into plastic specimen cups as were control samples consisting of the Bloomfield clay litter and 100% silica gel samples. To each of the control and silica-gel-containing samples, 10 ml of cat urine was added and the sample allowed to stand for 24 hours. A trained panel of four individuals then evaluated the odors. The results are shown in Table 1.

TABLE 1

| % Silica Gel | Raw Data | Range | Mean Intensity |
|---|---|---|---|
| LITTER PEARLS | | | |
| 0% | 7,6,5,4 | 4–7 | 5.5 |
| 1% | 8,6,6,4 | 4–8 | 5.5 |
| 5% | 5,5,5,3 | 3–5 | 4.5 |
| 10% | 3,4,4,3 | 3–4 | 3.5 |
| 20% | 4,2,3,2 | 2–4 | 2.8 |
| 100% | 2,2,1,1 | 1–2 | 1.5 |
| Desiccant Silica Gel | | | |
| 0% | 6,3,9,3 | 3–9 | 5.3 |
| 1% | 5,5,7,4 | 4–7 | 5.3 |
| 5% | 2,3,4,2 | 2–4 | 2.8 |
| 10% | 5,3,8,4 | 3–8 | 5.0 |
| 20% | 4,3,5,1 | 3–5 | 4.1 |
| 100% | 9,1,6,1 | 1–9 | 4.3 |

As seen in Table 1, the compositions containing LITTER PEARLS showed increasing odor control with increasing levels of silica gel. The threshold odor-controlling effect appeared at about 5% silica gel. The desiccant grade silica gel did not show a consistent odor controlling effect at any concentration including 100% silica gel. Notably, the desiccant silica gel is a Type A silica gel in contrast to the LITTER PEARLS which is a Type C silica gel. This suggests that Type C silica gel is effective in controlling odor, but Type A is not.

EXAMPLE 2

This example illustrates the odor-controlling effect silica gel at 5%, 10% and 20% in a mixture with a Bloomfield clay litter.

Samples of 4.5 lbs of material were prepare from Bloomfield clay litter and 5%, 10% and 20% LITTER PEARLS. Portions of each sample were hand treated with 8–20 grams fecal cubes and 160 ml female urine on day 1. The boxes were scooped on day 6 to remove waste areas and the samples prepared for sensory evaluation. The sensory test was scored on a scale of 0 to 60 (weak to strong aroma) by 17 trained panelists. Samples were placed in 9-inch aluminum pans and covered with 8-inch pie plates. Results are shown in Table 2.

TABLE 2

| | Aroma Intensities[1] | |
|---|---|---|
| % Silica Gel | Fecal/Urine | Ammonia |
| 0% | 14.3[A] | 0.6 |
| 5% | 13.6[A,B] | 0.5 |
| 10% | 11.7[B,C] | 0.6 |
| 20% | 11.2[C,D] | 0.7 |

[1]Scale 0 to 60, weak to strong aroma
[A,B,] and [C]indicate groups that were not significantly different (P = 0.05)

As seen in the table, 5%, 10% and 20% tended to show a decrease in odor intensity although only the 10% and 20% samples were significantly different at the 0.05 level from the control sample containing no silica gel. It is worth noting that the 5% level was also not significantly different from the 10% level. No difference in ammonia intensities was noted among the three samples. It is concluded from this test that the 5% level represents a level near the threshold amount of silica gel producing an odor-controlling effect.

EXAMPLE 3

This example illustrates the effect of 30%, 40% and 50% silica gel mixed with a clay litter composition.

Samples were prepared as follows: 30%, 40% and 50% silica gel in Bloomfield cat litter were prepared by combining either LITTER PEARLS of desiccant silica gel (see Example 1) in amounts of 680.4 grams silica gel/3.5 lbs litter, 907.2 grams silica gel/3.0 lbs. litter and 1134 grams silica gel/2.5 lbs litter, respectively.

Approximately 50 grams of each silica-containing sample and control were weighed into plastic specimen cups. To each of the samples and control, 10 ml of cat urine was added and the sample allowed to stand for 24 hours. A trained panel of six individuals then evaluated the odors. The results are shown in Table 3.

TABLE 3

| | Frequency Ranking | | | |
|---|---|---|---|---|
| % Silica Gel | 1st | 2nd | 3rd | 4th |
| LITTER PEARLS | | | | |
| 0% | 5 | 0 | 0 | 0 |
| 30% | 1 | 4 | 1 | 0 |
| 40% | 0 | 2 | 4 | 0 |
| 50% | 0 | 0 | 1 | 5 |
| Desiccant Silica Gel | | | | |
| 0% | 2 | 2 | 2 | 0 |
| 30% | 3 | 2 | 1 | 0 |
| 40% | 0 | 0 | 1 | 5 |
| 50% | 1 | 2 | 2 | 1 |

As shown in the table, the LITTER PEARLS tended to increase the number ranking of the samples indicating a lesser intensity of odor progressively for 30%, 40% and 50% silica gel samples. The 30% sample did not achieve statistical significance at the 0.05 level, however the samples containing 40% and 50% silica gel were significantly different from control (p=0.05). As noted above, the LITTER PEARLS constitute a Type C silica gel.

No consistent effect was seen with the desiccant silica gel which is a Type A silica gel (30% and 50% N.S.; 40% significant at p=0.05). This study further suggests that Type C silica gel such as the LITTER PEARLS is effective at concentrations up to 50% in the clay litter whereas, Type A silica gel is not consistently effective.

EXAMPLE 4

This example illustrates the effect of 0.5%, 1.0%, 2.5% and 5% silica gel mixed with clay litter.

Five samples were prepared containing 0.5%, 1.0%, 2.5% and 5% Type C silica gel in a conventional clay litter. The samples were treated with equal amounts of cat fecal and urine. The samples were evaluated by 7 sensory panelists and the rank order determined. Note that the lowest rank score indicates the least odor intensity. The results are shown in Table 4.

TABLE 4

| Silica gel | Rank Score |
|---|---|
| 0% | 3.0 |
| 0.5% | 3.6 |
| 1.0% | 3.0 |

TABLE 4-continued

| Silica gel | Rank Score |
|---|---|
| 2.5% | 3.6 |
| 5.0% | 2.0 |

As shown in Table 4, the addition of silica gel at concentrations of from 0.5% to 2.5% showed no discernable effect in reducing odor intensity. At 5.0%, however, some effectiveness in reducing odor intensity is seen.

EXAMPLE 5

This example illustrates the effects of silica gel at 2.5%, 5.0%, 10% and 20% combined conventional clay and scoopable clay from different sources.

Type C silica gel was combined with clay litter material from different sources to obtain concentrations of 2.5%, 5.0%, 10% and 20% with King William and Maricopa conventional litter and concentrations of 2.5%, 5.0%, and 10% with Bloomfield conventional and scoopable litter. The King William litter is comprised of a calcium montmorillonite obtained from King William, Va. and the Maricopa litter is comprised of an opal silica and calcium montmorillonite clay mixture obtained from Maricopa, Calif. The samples were prepared and treated as in Example 4. The results with King William and Maricopa litters are shown in Table 5 and the results with the Bloomfield litters are shown in Table 6. Results are repeated or rank sum (higher number indicates power odor intensity).

TABLE 5

| Silica Gel | Rank Sum |
|---|---|
| King William | |
| 0% | 14 |
| 2.5% | 16 |
| 5.0% | 15 |
| 10% | 27 |
| 20% | 33 |
| Maricopa | |
| 0% | 11 |
| 2.5% | 20 |
| 5.0% | 16 |
| 10% | 28 |
| 20% | 30 |

TABLE 6

| Silica Gel | Rank Sum |
|---|---|
| Bloomfield Conventional | |
| 0% | 16 |
| 2.5% | 13 |
| 5.0% | 19 |
| 10% | 22 |
| Bloomfield Scoopable | |
| 0% | 11 |
| 2.5% | 22 |
| 5.0% | 17 |
| 10% | 20 |

As shown in the table, the rank sum tended to increase with increasing silica gel concentration for all litters tested.

EXAMPLE 6

This example illustrates the effect of 10% and 20% silica gel in conventional Bloomfield clay litter.

Samples were prepared by mixing 10% and 20% Type C silica gel with Bloomfield conventional clay litter. The samples were hand treated with a one-time addition of 8 fecal cubes and 160 ml urine followed by 5 day test period for sensory evaluation, samples were mixed thoroughly, split and equal volumes placed in urine specimen cups. The samples were evaluated by 19 trained panelists. The results are shown in Table 7.

TABLE 7

| | Aroma Intensities[1] | |
|---|---|---|
| % Silica Gel | Fecal/Urine | Ammonia |
| 0% | 12.9 | 0.4 |
| 10% | 10.2[2] | 0.4 |
| 20% | 8.1[2,3] | 0.4 |

[1]Scale 0 to 60, weak to strong aroma
[2]Significantly different from control at p = 0.1.
[3]Significantly different from control at p = 0.05.

As shown in the table the 10% and 20% concentrations of silica gel decreased the amount of odor in the samples. No effect was, however, seen on ammonia intensity.

EXAMPLE 7

This example illustrates that fragrances can be added to 5% silica gel litter composition to control odor.

Samples of 5% silica gel were prepared with conventional and scoopable Bloomfield litter. In addition, fragrance was added in powder or liquid form or as a combination of microencapsulated powder or liquid. Any of a number of fragrances can be used of which one preferred fragrance is an herbal-pine fragrance. The samples were evaluated and the results are shown in Table 8.

TABLE 8

| | Intensities[1] | | |
|---|---|---|---|
| Litter Containing 5% Silica Gel | fecal/urine | ammonia | fragrance |
| Scoopable Litter | | | |
| No Fragrance | 10.1[a] | 0.4 | 8.2[a] |
| Powder Fragrance | 6.7[b] | 0.4 | 10.9[a] |
| Liquid Fragrance | 4.1[c] | 0.4 | 18.7[b] |
| Conventional Litter | | | |
| No Fragrance | 12.0[a] | 0.4 | 9.7[a] |
| Powder/Liquid | 8.5[b] | 0.6 | 9.8[a] |
| Liquid Fragrance | 6.2[c] | 0.5 | 16.2[b] |

[1]0–60 point scale, weak to strong aroma
[a,b,c]indicates values are significantly different at p = 0.001

As seen in the table, the fragrance in either powder or liquid form was detected and masked fecal/urine odors in both scoopable and conventional litter containing 5% silica gel.

EXAMPLE 8

This example illustrates the preparation of a conventional and a scoopable clay litter composition.

Conventional Clay Litter

Conventional clay litter does not clump with urine to form a scoopable agglomeration. Calcium montmorillonite clay in an amount which is calculated to be 95% of the total weight of the litter is dried, granulated, and sized to obtain a particle size range of 0.25 to 3.4 mm. Properly sized clay granules are passed through an air ladder for air removal of fine dust particles. The clay then passes along an additive conveyor on which aqueous forms of additives are applied by spraying onto the clays surface. These additives include fragrance, dust control agents, and antimicrobial agents. The fragrance is a starch encapsulated powder form and/or an emulsified fragrance oil in water for spraying onto the clay surface. Any of a number of fragrances can be used of which one preferred fragrance is an herbal-pine fragrance. The antimicrobial additive is MYACIDE or Bronopol and the dust control agent is polytetrafluoroethylene.

Type C granular silica gel having a typical granule size of 1.0 to 6.0 mm particle diameter is layered onto the clay and may be sprayed with color agent to enhance the appearance of the product. As the conveyor belt carries the clay with silica gel layered on top, the material passes stationary plows to allow mixing of the ingredients to occur. In a similar fashion, dry powder additives can be applied such as encapsulated fragrance powders. In lieu of a conveyor system, dry materials (clays, silica gel, and additive powders) can be blended together in a screw auger, ribbon blender or other mixing devices.

Scoopable Clay Litter

Scoopable Clay litter forms clumps with urine to form a scoopable agglomeration.

Sodium bentonite clay in an amount calculated to be 80% of the total weight of the litter is dried, granulated, and sized to a particle size range of 0.4–1.7 mm. and calcium montmorillonite clay in an amount calculated to be 15% of the total weight of the litter is dried, granulated and sized to a particle size of 0.25–1.2 mm. Properly sized clay granules pass through an air ladder for air removal of fine dust particles. The clays are mixed and then passes along an additive conveyor on which aqueous forms of additives are applied by spraying onto the clay surface. These additives include fragrance, dust control agents, and antimicrobial agents. The fragrance is a starch encapsulated powder form and/or an emulsified fragrance oil in water for spraying onto the clay surface. Any of a number of fragrances can be used of which one preferred fragrance is an herbal-pine fragrance. The antimicrobial additive is MYACIDE or Bronopol and the dust control agent is polytetrafluoroethylene.

Type C granular silica gel having a typical granule size of 0.15–2.0 mm particle diameter is layered onto the clay and may be sprayed with color agent to enhance the appearance of the product. As the conveyor belt carries the clay with silica gel layered on top, the material passes stationary plows to allow mixing of the ingredients to occur. In a similar fashion, dry powder additives can be applied such as encapsulated fragrance powders and guar gum with sodium borate to aid in the clumping. In lieu of a conveyor system, dry materials (clays, silica gel, and additive powders) can be blended together in a screw auger, ribbon blender or other mixing devices.

All references cited in this specification are hereby incorporated by reference. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. An animal litter composition comprising a mixture of an absorbant material and silica gel wherein the silica gel is present in an amount effective in controlling odor in the composition.

2. The composition according to claim 1 wherein the silica gel is Type C silica gel.

3. The composition according to claim 2 comprising from about 5% to about 50% (w/w) silica gel.

4. The composition according to claim 3 wherein the silica gel comprises silica gel particles having an average pore diameter from about 8 nm to about 10 nm.

5. The composition according to claim 1 wherein the absorbant material is clay.

6. The composition according to claim 5 wherein the clay is selected from the group consisting of a smectite, an attapulgite, a kaolin, an opal clay and a combination thereof.

7. The composition according to claim 6 wherein the clay is a calcium montmorillonite or a sodium bentonite.

8. The composition according to claim 7 comprising from about 50% to about 95% (w/w) clay.

9. The composition according to claim 8 comprising clay particles and silica gel particles wherein the clay particles have an average size and shape sufficiently similar to average size and shape of the silica gel particles to prevent separation of the clay particles and silica gel particles.

10. The composition according to claim 9 wherein the average size of the clay particles is no more than 10% greater or lesser than the average particle size of the silica gel particles.

11. The composition according to claim 9 wherein at least 90% (w/w) of the clay comprises clay particles have a diameter of from about 3.4 mm to about 0.6 mm and at least 90% (w/w) of the silica gel particles comprises silica gel particles having a diameter of from about 5 mm to about 1 mm.

12. The composition according to claim 5 further comprising an odor masking agent.

13. The composition according to claim 12 wherein the odor masking agent is a perfume, a fragrance, or an essential oil.

14. A granular composition comprising clay and silica gel wherein the silica gel is not impregnated with an odor masking agent.

15. The composition according to claim 14 wherein the silica gel is Type C silica gel.

16. The composition according to claim 15 comprising from about 5% to about 50% (w/w) silica gel.

17. The composition according to claim 16 wherein the silica gel comprises silica gel particles having an average pore diameter from about 8 nm. to about 10 nm.

18. The composition according to claim 17 wherein the clay is selected from the group consisting of a smectite, an attapulgite, a kaolin, an opal clay and a combination thereof.

19. The composition according to claim 18 wherein the clay is a calcium montmorillonite or a sodium bentonite.

20. The composition according to claim 19 comprising from about 50% to about 95% (w/w) clay.

21. The composition according to claim 20 comprising clay particles and silica gel particles wherein the clay particles have an average size and shape sufficiently similar to average size and shape of the silica gel particles to prevent separation of the clay particles and silica gel particles.

22. The composition according to claim 21 wherein the average size of the clay particles is no more than 10% greater or lesser than the average particle size of the silica gel particles.

23. The composition according to claim 21 wherein at least 90% (w/w) of the clay comprises clay particles have a diameter of from about 3.4 mm to about 0.6 mm and at least 90% (w/w) of the silica gel particles comprises silica gel particles having a diameter of from about 5 mm to about 1 mm.

24. The composition according to claim 14 further comprising an odor masking agent.

25. The composition according to claim 24 wherein the odor masking agent is a perfume, a fragrance, or an essential oil.

26. An animal litter composition comprising an absorbant material and silica gel wherein the silica gel is present in an amount selected to control odor in the composition.

27. The composition according to claim 26 wherein the silica gel is Type C silica gel.

28. The composition according to claim 27 comprising from about 5% to about 50% (w/w) silica gel.

29. The composition according to claim 28 wherein the silica gel comprises silica gel particles having an average pore diameter from about 8 nm. to about 10 nm.

30. The composition according to claim 26 wherein the absorbant material is clay.

31. The composition according to claim 30 wherein the clay is selected from the group consisting of a smectite, an attapulgite, a kaolin, an opal clay and a combination thereof.

32. The composition according to claim 31 wherein the clay is a calcium montmorillonite or a sodium bentonite.

33. The composition according to claim 32 comprising from about 50% to about 95% (w/w) clay.

34. The composition according to claim 33 comprising clay particles and silica gel particles wherein the clay particles have an average size and shape sufficiently similar to average size and shape of the silica gel particles to prevent separation of the clay particles and silica gel particles.

35. The composition according to claim 34 wherein the average size of the clay particles is no more than 10% greater or lesser than the average particle size of the silica gel particles.

36. The composition according to claim 33 wherein at least 90% (w/w) of the clay comprises clay particles have a diameter of from about 3.4 mm to about 0.6 mm and at least 90% (w/w) of the silica gel particles comprises silica gel particles having a diameter of from about 5 mm to about 1 mm.

37. The composition according to claim 26 further comprising an odor masking agent.

38. The composition according to claim 37 wherein the odor masking agent is a perfume, a fragrance, or an essential oil.

39. A kit comprising silica gel and instructions for addition of the silica gel to an animal litter composition in an amount effective in controlling odor in the composition, packaged in a container.

40. The kit according to claim 39 wherein the silica gel is Type C silica gel.

41. The kit according to claim 40 wherein the silica gel comprises silica gel particles having an average pore diameter from about 8 nm to about 10 mm.

42. The kit according to claim 39 comprising instructions for addition of the silica gel to an animal litter composition in an amount of from about 5% to about 50% (w/w) silica gel.

43. The kit according to claim 39 comprising instructions for addition of the silica gel to an animal litter composition comprising clay.

44. The kit according to claim 39 comprising silica gel, an adsorbant material and instructions for mixing the silica gel with the adsorbant material.

45. The kit according to claim 43 wherein the clay is selected from the group consisting of a smectite, an attapulgite, a kaolin, an opal clay and a combination thereof.

46. The kit according to claim 45 wherein the clay is a calcium montmorillonite or a sodium bentonite.

47. The kit according to claim 46 comprising instructions for mixing the silica gel with from about 50% to about 95% (w/w) clay.

48. The kit according to claim 47 comprising clay particles and silica gel particles wherein the clay particles have an average size and shape sufficiently similar to average size and shape of the silica gel particles to prevent separation of the clay particles and silica gel particles upon mixing and further handling.

49. The kit according to claim 48 wherein the average size of the clay particles is no more than 10% greater or lesser than the average particle size of the silica gel particles.

50. The kit according to claim 48 wherein at least 90% (w/w) of the clay comprises clay particles have a diameter of from about 3.4 mm to about 0.6 mm and at least 90% (w/w) of the silica gel particles comprises silica gel particles having a diameter of from about 5 mm to about 1 mm.

51. The kit according to claim 39 further comprising an odor masking agent.

52. The kit according to claim 51 wherein the odor masking agent is a perfume, a fragrance, or an essential oil.

53. A method for controlling odor in an animal litter, the method comprising adding silica gel to an animal litter comprising an absorbant material, wherein the silica gel is added in an amount effective in controlling odor.

54. The method according to claim 53 wherein the silica gel is Type C silica gel.

55. The method according to claim 54 comprising adding from about 5% to about 50% (w/w) silica gel.

56. The composition according to claim 55 wherein the silica gel comprises silica gel particles having an average pore diameter from about 8 nm. to about 10 nm.

57. The method according to claim 53 wherein the absorbant material is clay.

58. The method according to claim 57 wherein the clay is selected from the group consisting of a smectite, an attapulgite, a kaolin, an opal clay and a combination thereof.

59. The method according to claim 58 wherein the clay is a calcium montmorillonite or a sodium bentonite.

60. The method according to claim 58 wherein the animal litter comprises from about 50% to about 95% (w/w) clay.

61. The method according to claim 60 comprising adding silica gel particles to clay particles wherein the silica gel particles have an average size and shape sufficiently similar to average size and shape of the clay particles to prevent separation of the clay particles and silica gel particles.

62. The method according to claim 61 wherein the average size of the clay particles is no more than 10% greater or lesser than the average particle size of the silica gel particles.

63. The method according to claim 61 wherein at least 90% (w/w) of the clay comprises clay particles have a diameter of from about 3.4 mm to about 0.6 mm and at least 90% (w/w) of the silica gel particles comprises silica gel particles having a diameter of from about 5 mm to about 1 mm.

64. The method according to claim 53 further comprising an odor masking agent.

65. The method according to claim 64 wherein the odor masking agent is a perfume, a fragrance, or an essential oil.

66. A method for controlling odor in an animal litter, the method comprising selecting silica gel on the basis of the silica gel providing odor control and adding the silica gel to an animal litter containing an absorbant material.

67. The method according to claim 66 wherein the silica gel is Type C silica gel.

68. The method according to claim 67 comprising adding from about 5% to about 50% (w/w) silica gel.

69. The composition according to claim 68 wherein the silica gel comprises silica gel particles having an average pore diameter from about 8 nm. to about 10 nm.

70. The method according to claim 66 wherein the absorbant material is clay.

71. The method according to claim 70 wherein the clay is selected from the group consisting of a smectite, an attapulgite, a kaolin, an opal clay and a combination thereof.

72. The method according to claim 71 wherein the clay is a calcium montmorillonite or a sodium bentonite.

73. The method according to claim 71 comprising from about 50% to about 95% (w/w) clay.

74. The method according to claim 73 comprising adding silica gel particles to clay particles wherein the silica gel particles have an average size and shape sufficiently similar to average size and shape of the clay particles to prevent separation of the clay particles and silica gel particles.

75. The method according to claim 74 wherein the average size of the clay particles is no more than 10% greater or lesser than the average particle size of the silica gel particles.

76. The method according to claim 74 wherein at least 90% (w/w) of the clay comprises clay particles have a diameter of from about 3.4 mm to about 0.6 mm and at least 90% (w/w) of the silica gel particles comprises silica gel particles having a diameter of from about 5 mm to about 1 mm.

77. The method according to claim 66 further comprising an odor masking agent.

78. The method according to claim 77 wherein the odor masking agent is a perfume, a fragrance, or an essential oil.

79. A method for making an odor-controlling animal litter composition, the method comprising combining an absorbent material and an amount of silica gel effective in controlling odor.

80. The method according to claim 79 wherein the silica gel is Type C silica gel.

81. The method according to claim 80 comprising combining an absorbant material and from about 5% to about 50% (w/w) silica gel.

82. The method according to claim 81 wherein the silica gel comprises silica gel particles having an average pore diameter from about 8 nm. to about 10 nm.

83. The method according to claim 79 wherein the absorbant material is clay.

84. The method according to claim 83 wherein the clay is selected from the group consisting of a smectite, an attapulgite, a kaolin, an opal clay and a combination thereof.

85. The method according to claim 84 wherein the clay is a calcium montmorillonite or a sodium bentonite.

86. The method according to claim 84 comprising combining from about 50% to about 95% (w/w) clay with silica gel.

87. The method according to claim 86 comprising combining clay particles and silica gel particles wherein the clay particles have an average size and shape sufficiently similar to average size and shape of the silica gel particles to prevent separation of the clay particles and silica gel particles.

88. The method according to claim 87 wherein the average size of the clay particles is no more than 10% greater or lesser than the average particle size of the silica gel particles.

89. The method according to claim 87 wherein at least 90% (w/w) of the clay comprises clay particles have a diameter of from about 3.4 mm to about 0.6 mm and at least 90% (w/w) of the silica gel particles comprises silica gel particles having a diameter of from about 5 mm to about 1 mm.

90. The method according to claim 79 further comprising adding an odor masking agent.

91. The method according to claim 90 wherein the odor masking agent is a perfume, a fragrance, or an essential oil.

92. A method for making an odor-controlling animal litter composition, the method comprising selecting silica gel on the basis of the silica gel providing odor control and adding the silica gel to an animal litter containing an absorbant material.

93. The method according to claim 92 wherein the silica gel is Type C silica gel.

94. The method according to claim 93 wherein adding the silica gel to an animal litter containing an absorbant material comprises adding from about 5% to about 50% (w/w) silica gel to an animal litter containing an absorbant material.

95. The composition according to claim 94 wherein the silica gel comprises silica gel-particles having an average pore diameter from about 8 nm. to about 10 nm.

96. The method according to claim 92 wherein the absorbant material is clay.

97. The method according to claim 96 wherein the clay is selected from the group consisting of a smectite, an attapulgite, a kaolin, an opal clay and a combination thereof.

98. The method according to claim 97 wherein the clay is a calcium montmorillonite or a sodium bentonite.

99. The method according to claim 97 wherein the clay is present in the animal litter in an amount from about 50% to about 95% (w/w).

100. The method according to claim 99 comprising combining silica gel particles and an animal litter containing clay particles wherein the clay particles have an average size and shape sufficiently similar to average size and shape of the silica gel particles to prevent separation of the clay particles and silica gel particles.

101. The method according to claim 100 wherein the average size of the clay particles is no more than 10% greater or lesser than the average particle size of the silica gel particles.

102. The method according to claim 100 wherein at least 90% (w/w) of the clay comprises clay particles have a diameter of from about 3.4 mm to about 0.6 mm and at least 90% (w/w) of the silica gel particles comprises silica gel particles having a diameter of from about 5 mm to about 1 mm.

103. The method according to claim 92 further comprising adding an odor masking agent.

104. The method according to claim 103 wherein the odor masking agent is a perfume, a fragrance, or an essential oil.

* * * * *

(12) EX PARTE REEXAMINATION CERTIFICATE (7698th)
United States Patent
Raymond et al.

(10) Number: US 6,578,521 C1
(45) Certificate Issued: Aug. 24, 2010

(54) ANIMAL LITTER COMPOSITION CONTAINING SILICA GEL AND METHODS THEREOF

(75) Inventors: Marvin L. Raymond, Wildwood, MO (US); Anne D. Woodbury, St. Louis, MO (US)

(73) Assignee: Nestec Ltd., Vevey (CH)

Reexamination Request:
No. 90/007,664, Aug. 12, 2005

Reexamination Certificate for:
Patent No.: 6,578,521
Issued: Jun. 17, 2003
Appl. No.: 10/264,558
Filed: Oct. 4, 2002

Related U.S. Application Data

(63) Continuation of application No. 09/731,489, filed on Dec. 7, 2000, now Pat. No. 6,543,385.

(51) Int. Cl.
*A01K 29/00* (2006.01)

(52) U.S. Cl. ........................................ 119/171
(58) Field of Classification Search .......... 119/171–173, 119/165
See application file for complete search history.

(56) References Cited

U.S. PATENT DOCUMENTS

| | | | | |
|---|---|---|---|---|
| 4,085,704 A | * | 4/1978 | Frazier | 119/173 |
| 4,607,594 A | * | 8/1986 | Thacker | 119/172 |
| 4,712,508 A | | 12/1987 | Lowe | |
| 5,005,520 A | | 4/1991 | Michael | |
| RE33,983 E | | 7/1992 | Hughes | |
| 5,860,391 A | * | 1/1999 | Maxwell et al. | 119/173 |
| 5,970,915 A | * | 10/1999 | Schlueter et al. | 119/171 |

FOREIGN PATENT DOCUMENTS

| | | |
|---|---|---|
| JP | 11-220966 | 8/1999 |
| JP | 11-276004 | 10/1999 |

OTHER PUBLICATIONS

Crystal Clear Litter Pearls (1998) product bag, published, i.e. made available to the public via commercial channels for retail sale in 1998.*
Website article from e-opinions, http://www.epinions.com/review/Harvest_Ventures_Crystal_Clear_Litter_Pearls/pets-review-68C8-77C7BDD-39996AF-prod6, date Aug. 2000.*
Website article from e-opinions, http://www.epinions.com/review/Harvest_Ventures_Crystal_Clear_Litter_Pearls/pets-review-4EE8-15F9B7EF-3A116B04-prod2, dated Nov. 2000.*
Ocean International Co. Ltd, Products Use Of silica gel, http://www.china-silicagel.net/useofsilicagel.htm.*
Dictionary of Geologlcal Terms, Third Edition, Anchor Books, A Division of Random House, Inc., New York Copyright © 1957, 1960, 1962, 1976, 1984 by the American Geological Institute.*
"Crystal Clear Litter Pearls", printed packaging, published Apr. 9, 1999, Castro Valley, California.
"Pet-Page", p. 55, published Aug. 8, 1998, Japan.

* cited by examiner

*Primary Examiner*—Jeffrey R. Jastrzab

(57) ABSTRACT

An animal litter composition comprising a mixture of an absorbant material such as clay and silica gel is disclosed. The Litter composition effectively absorbs liquid wastes and controls odors. Also disclosed are methods of making and using the litter composition.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-104 are cancelled.

* * * * *